United States Patent [19]

Belt

[11] 3,766,717
[45] Oct. 23, 1973

[54] PARTICLE COLLECTOR FOR CLEANING GASES
[75] Inventor: Verland W. Belt, Richmond, Va.
[73] Assignee: Josam Developments, Inc., Michigan City, Ind.
[22] Filed: June 12, 1972
[21] Appl. No.: 261,715

Related U.S. Application Data
[63] Continuation of Ser. No. 98,623, Dec. 16, 1970, abandoned.

[52] U.S. Cl................... 55/223, 55/227, 55/238, 55/239, 55/240, 55/257, 261/79 A
[51] Int. Cl............................................. B01d 47/02
[58] Field of Search............... 55/93-95, 223, 227, 235-239, 241; 261/79 A

[56] References Cited
UNITED STATES PATENTS
1,940,197 12/1933 Wagner................................. 55/239
3,524,631 8/1970 Mare..................................... 55/223

FOREIGN PATENTS OR APPLICATIONS
1,188,524 4/1970 Great Britain......................... 55/94

Primary Examiner—Bernard Nozick
Attorney—P. D. Golrick

[57] ABSTRACT

A conically-sump-bottomed, vertical, cylindrical vessel is horizontally partitioned by a header plate loosely pendently supporting an array of tubes into an upper gas inlet chamber with a radial gas inlet and, above a sump water level, a lower gas flow chamber wherein a mist abating perforated end of a vertical cylindrical outlet duct is eccentrically located remotely from the inlet. The array of tubes with upper ends projecting loosely through and slightly above the plate directs gas from the inlet chamber against the water surface in the sump. Water, nozzle-sprayed into the incoming gas both wets the tube inner surface and collects on the plate to seep between the plate and (a) tube ends, (b) duct, and (c) vessel wall to wet the outer tube surfaces, duct and wall, and carries material, picked up by spray droplets and by the wide area films on the tubes, duct and wall, down into the sump for bottom withdrawal. Particles and droplets are further captured by the gas flow impinging on the sump water surface, and in flowing turbulently up from the water surface and around the externally wetted tubes and through the perforated outlet.

10 Claims, 4 Drawing Figures

United States Patent [19]
Belt
[11] 3,766,717
[45] Oct. 23, 1973
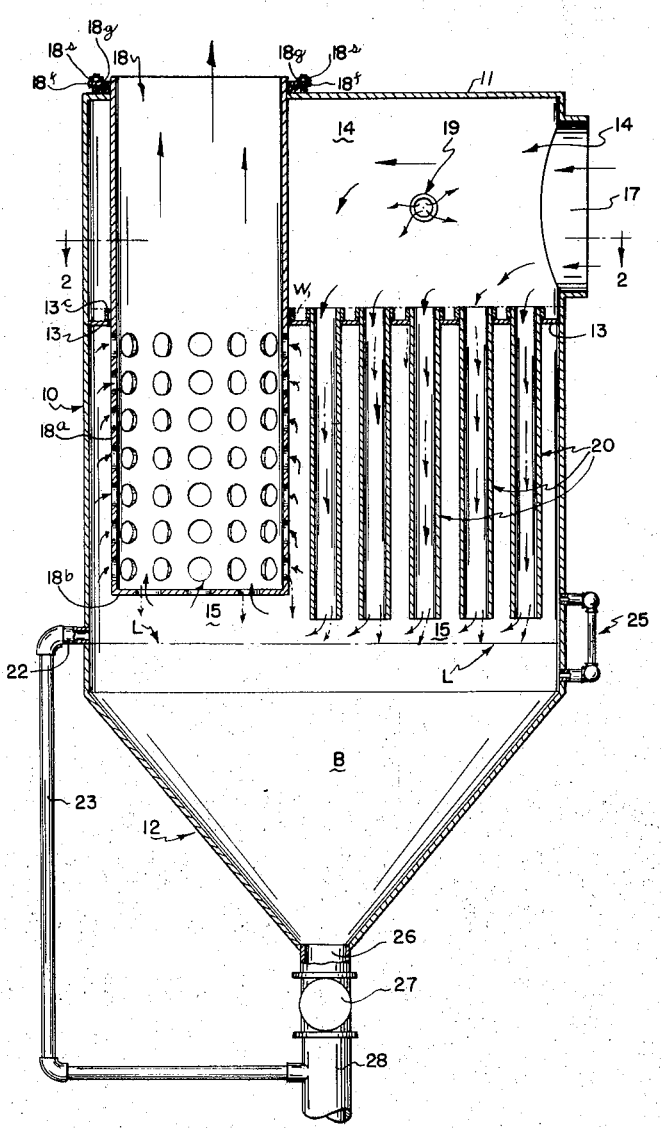

INVENTOR
VERLAND W. BELT
BY

*Ely, Golrick & Flynn*
ATTORNEYS

INVENTOR
VERLAND W. BELT
BY
Ely, Golrick & Flynn
ATTORNEYS

PARTICLE COLLECTOR FOR CLEANING GASES

This is a continuation of application Ser. No. 98,623, filed Dec. 16, 1970 now abandoned.

The general object of the present invention is to provide means for removing gas-borne material from a gas stream. A more particular object is to provide relatively simple apparatus effective to remove dust, droplets and other particulate matter, from flowing gas such as the exhaust gas streams of industrial processes or equipment, or air discharged by ventillating systems from the locations where dust generating operations or the like are carried out.

Another object is to provide an apparatus for gas scrubbing purposes which is relatively inexpensive both in initial fabrication and as well in servicing and maintenance.

The invention will be hereinafter described through a particular embodiment in terms of removal of dust from air, and of water as a collecting or scrubbing liquid, but it is to be understood that the invention is not so restricted in utility or application, as various solid particles, fibrous bits, liquid droplets, even some condensible vapors, soluble gases, or smokes, therefore material of colloidal dimensions, may be removed depending on the nature of the materials involved and selection of collecting liquid.

Other objects and advantages will appear from the following description and the drawings wherein.

Figure 1:
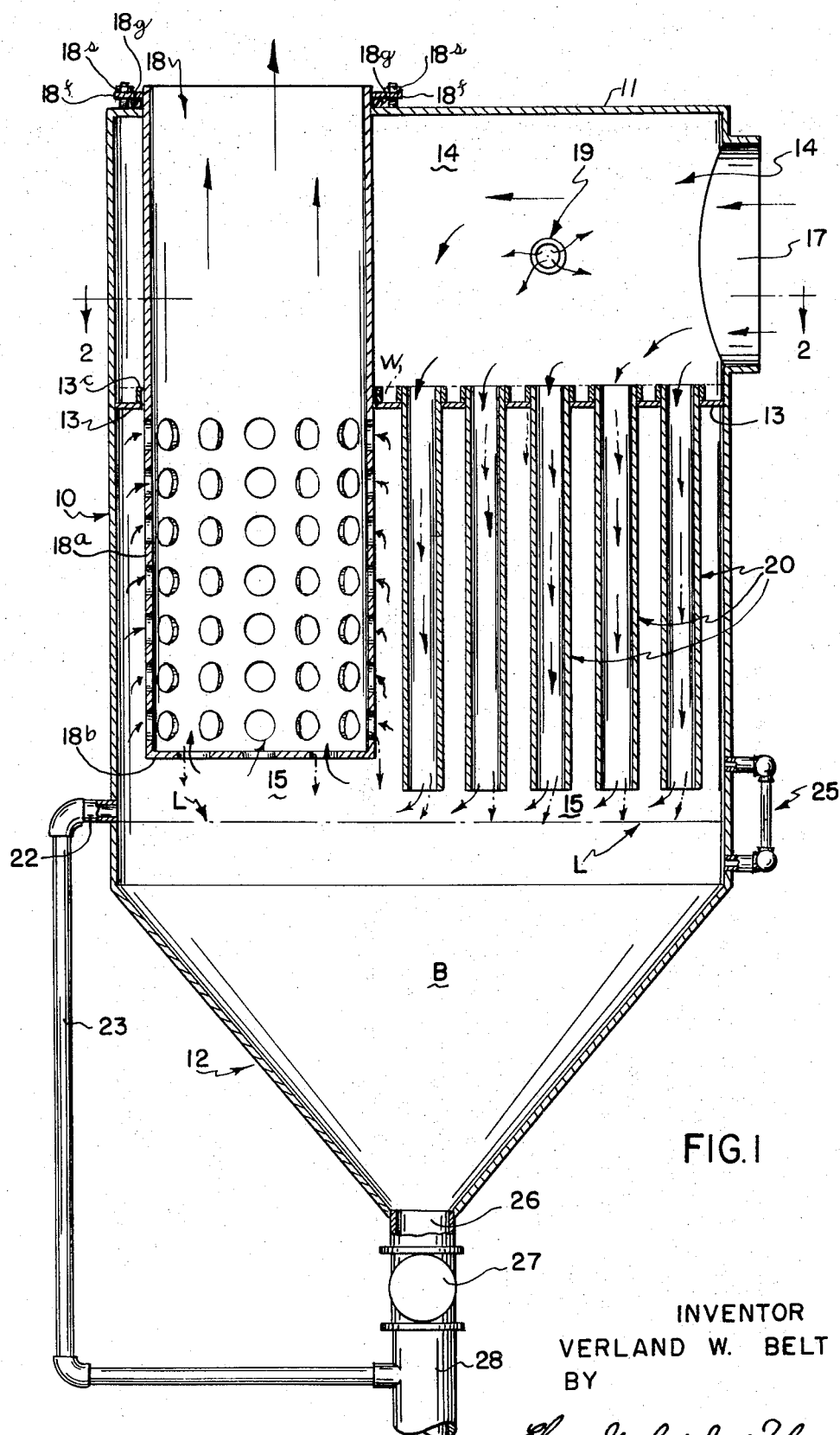
FIG. 1 is a generally vertical section through one form of apparatus in accordance with the invention.

The apparatus in which the invention is here embodied comprises a generally upright cylindrically shaped vessel in which the cylindrical body 10 has ends closed by the top 11 and conical bottom 12; and a horizontal bulkhead plate 13 dividing the body into upper and lower chambers 14 and 15. The air stream to be treated or scrubbed enters at radial inlet 17 and the scrubbed air leaves through the vertical outlet duct 18 located eccentrically of the body vertical axis diametrically away from the inlet. The air is, of course moved by a pressure differential established between the inlet 17 and outlet 18 by conventional means not shown, such as a pump or blower either discharging to inlet 17 or drawing air from outlet 18. In the drawings gas flow is indicated by solid line arrows, water flow paths by dotted line arrows.

To mix a spray of particle-capturing water droplets into the incoming air, spraying means disposed in the top chamber 14 comprises one or more water spray heads 19 supplied by water under pressure, either from a general water source or reclaimed from the dust laden water produced by operation of the apparatus.

Figure 2:
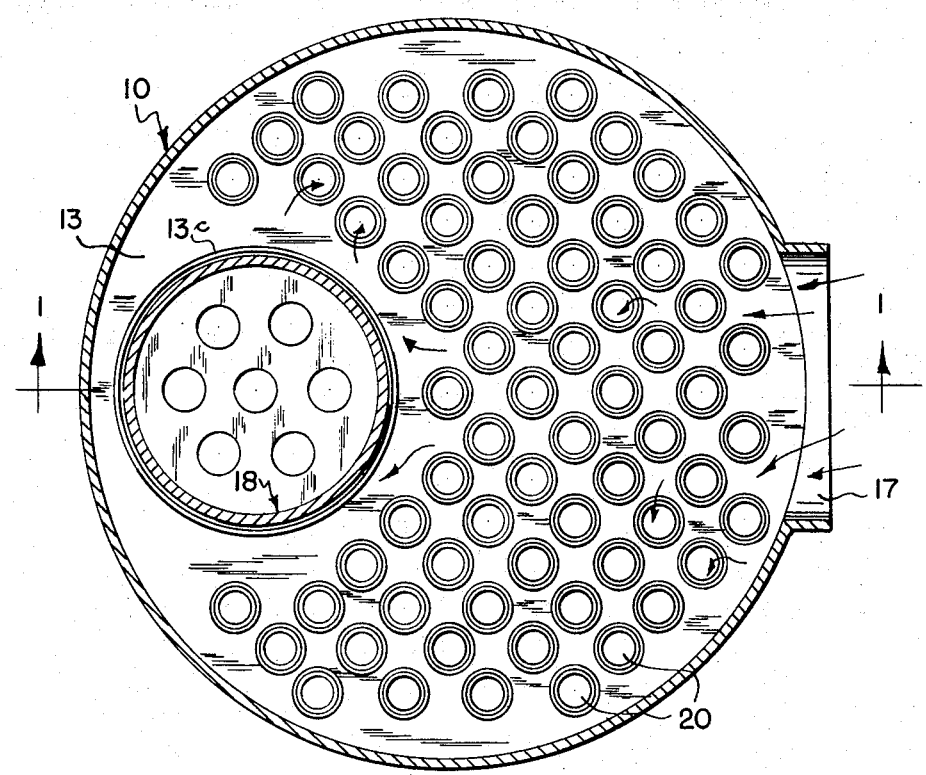
FIG. 2 is a horizontal section taken as indicated by the line 2—2 in FIG. 1.

A set of numerous like end-flanged tubes 20 are passed through and either loosely hung or secured in apertures in plate 13 in a location pattern (see also FIG. 2) presenting staggered tube rows as viewed in a direction from inlet 17 to outlet duct 18; the bottom ends of tubes 20 being spaced somewhat above the normal static surface L of body of water B retained in the vessel bottom region as a sump. This level is established at or slightly above the height of the vessel by-pass or overflow outlet fitting 22 for overflow discharge through the by-pass line 23 to drain line 28, which is connected to the sump bottom discharge opening 26 at the cone apex by a sump bottom discharge flow control valve 27.

By regulation of the water supplied at spray head means 19 relative to the amount discharged from the sump bottom to drain line 28, the operating water level range is kept below tubes 20 as observed by sight glass 25 connected to the vessel body. A moderate excess water supply is accommodated by overflow through the bypassing overflow outlet 22, thus simplifying regulation.

The tubes 20 by their respective end flanges are supported loosely or secured, preferably releasably, on plate 13 with their top inlet ends at a common level, therefore a water overflow level, for accumulating spray in a layer of water W above plate 13. This water layer on reaching the tops of the tubes overflows the tube end circumferences to wash downwardly to the sump along with some gas-entrained spray droplets gathered on the pipe interiors as a wetting film $W_i$ and determines also a liquid head for similar flow of water passing under the tube end flanges and then between tubes and respective plate apertures to wash down over the tube exteriors as a film $W_x$ as permitted by the loose fit.

Figure 3:
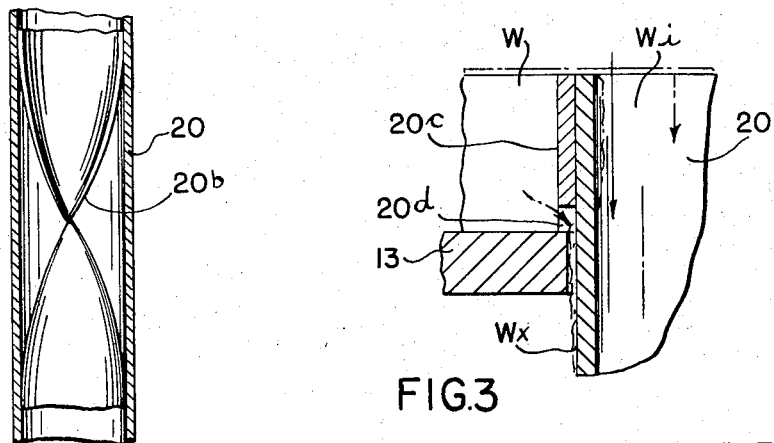
FIG. 3 is an enlarged fragmentary view of a tube support region.

As shown in FIG. 3, for each tube the top end flange may take the form of a short collar 20c secured thereon, with the collar bottom edge providing the flange or support shoulder preferably having a plurality of spaced edge notches 20d to ensure even flow distribution to the outer tube wall; or the tube end may be flared outwardly and back down with or without slitting into tabs or lugs; or other apt forms. For example, rather than having a collar 20c, each tube top end may be formed with short shallow longitudinal outward, or inward and outward, ribs to engage the aperture edge for support while providing access for water flow to the gap between the aperture edge and tube.

Figure 4:
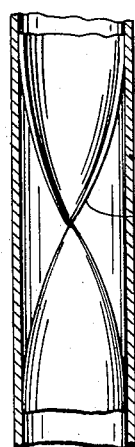
FIG. 4 is a fragmentary baffle detail.

Especially advantageous is the use of metal or other strips twisted about the longitudinal axes and inserted centrally as centrifugal baffles in, but supported spaced from the descending film carrying walls of, tubes 20 as shown in FIG. 4 at 20b; and a similar "twist" baffle may be used in duct 18.

The duct 18, preferably to welding where it passes through top 11, has a removable gas tight securement through a circumferential flange 18f clamped at several locations, as at 18s by nuts on studs, to seal against top 11 through gasket 18g. Duct 18 is slipped through a water overflow collar 13c about the edge of the corresponding aperture of plate 13 below which the dependent duct portion, serving as a mist abating duct gas intake chest, has its cylindrical wall 18a and its end wall 18b provided with a large number of equi-spaced perforations or screened openings through which the gas stream flows from the bottom chamber to the top outlet of 18. Preferably the clearance between 18 and plate aperture collar 13c is such as to allow ready insertion and removal of 18, and descent of a water film washing the exterior of 18a, but preventing appreciable by-pass of gas from chamber 14 to duct 18. This removable mounting of duct 18, effectively gas sealed to both top 11 and plate 13 under operating conditions, simplifies and facilitates not only fabrication, but also maintenance service in cleaning and repair. Conveniently, where the inlet opening at 17 or the top opening for 18 are not sufficient or convenient for the purpose, a central access opening in top 11 is provided through which the tubes 20 may be easily removed and rehung for service cleaning, repair or replacement, since, with or without releasable securement, they are merely slip fitted into plate 13.

The circumference of plate 13 aptly may be secured to the body 10, and also the duct 18 may be secured to the edge of the aperture of plate 13 (where the disclosed preferred removable mount is not used for duct 18), by short spaced weld beads rather than sealing welds. This leaves slight gaps by which water may flow from layer W on plate 13 to wash down the walls of 18a and of body 10 within the bottom chamber; while yet maintaining a seal against any objectionable degree of gas by-pass from the upper to lower chambers, and also a tube overflowing layer of water on the tray or plate partition 13.

With this arrangement dirty air entering the top chamber encounters and mixes with the supply water spray droplets as a first occasion of particle capture, the droplets partly settling or draining from the vessel walls into the tray afforded by plate 13, and partly descending with the gas flow through the tubes 20. Both any entrained spray droplets and any yet free dust particles are further captured in contacting the downwardly flowing water film on the insides of respective tubes; in being directed down against the sump water surface; also, since the major part of the flow space to the scrubbed air outlet includes the space between tubes 20, in encountering the downwardly flowing water film on the tube exteriors; and finally in encountering, and passing through the holes of the gas intake chest portion of 18, to reach the air outlet. Longitudinal twist baffles in duct 18 and tubes 20 advantageously impart a rotation component to the flowing gas stream producing on the particles or droplets entrained therein a centrifugal separation action toward the surrounding walls.

The particles contained in the water descending from the upper chamber through and on the tubes 20 and also in that gathering and descending on 18, and on the interior wall surfaces of the lower chamber 15, as well as those captured by direct impingement on the retained water surface at L, thus are carried into the body of retained water in the sump. Particles, which have settled more or less rapidly to the conically sloped bottom to reach outlet 26, are carried out to drain line 28 with discharge water containing yet suspended particles, and possibly water soluble substances originally contained in the dirty air.

Baffling also may be provided in the chamber 14 for the air entering from inlet 17 to increase turbulence and hence mixing with the spray throughout the chamber. Also baffling may be associated with or disposed inside the outlet duct gas intake chest to improve its mist eliminating capability if required under particular conditions, such as the previously described twist baffling. Or for like purpose, the apertures of the latter may be formed by inwardly indenting and shearing to provide louvered formations at each aperture, in 18.

Large particle capturing liquid film exposure area is compactly provided; for example, in a vessel as shown about 68 inches high with a 38-inch diameter bulkhead suspending 70 tubes, each say 21 inches long, with 2-inch I.D. and 2⅜ O.D., there is provided per tube with a 1-inch top projection, about 0.92 and 1.09 square feet of interior and exterior wetted surface, or 2.01 square feet per tube, and thus a total of approximately 141 square feet of film wetted surface for the tubes alone.

Normally the preferred and most advantageous operation involves continual withdrawal of liquid from the bottom outlet 26, at a rate about equal to but somewhat less than the spray supply rate, so that with the excess being by-passed through 22–23, the level L is established by location of 22. But also, where the volume of solids in the gas is relatively small, or where only a small part of the dirt content represents settleable particles or solids, it may be desirable under the particular conditions of the installation to take the continual liquid withdrawal through 22–23, the latter being correspondingly sized; with only periodic or "as-required" withdrawal of a sludge of liquid and settled particles from the bottom.

I claim:

1. Apparatus for separating gas-borne substances from a stream of gas by scrubbing with a liquid, comprising:

a vessel closed at the top, and at the bottom closed by a bottom wall structure downwardly convergent to a bottom outlet of the vessel, a transverse plate partition dividing the vessel into an upper chamber and a lower chamber, a lateral gas stream inlet into the said upper chamber, scrubbing liquid spray head means disposed in said upper chamber adapted to spray said liquid supplied thereto under pressure as particle-gathering droplets into gas entering from said inlet into the upper chamber as a mixing chamber, wherein said droplets descend to gather in part as a liquid layer on said partition, an outlet duct, opening through the vessel, and having a gas intake chest disposed in the upper region of said lower chamber and having chest wall portions provided with numerous gas passage apertures, said chest occupying only a minor part of the horizontal extent of the upper region, an externally discharging overflow liquid by-pass outlet opening from the lower chamber of the vessel at a region where a normal level is to be established for a retained body of said liquid in the bottom region of the lower chamber as a sump, a numerous plurality of tubes extending through respective apertures in, and dependent from, said plate partition and having a loose fit in their respective apertures, to define spaces between the tubes and apertures, said tubes having top ends spaced above said partition whereby said liquid sprayed into said mixing chamber may pass into said tubes and may pass, from said layer gathered on said plate, between said tubes and respective said apertures to form particle and droplet gathering liquid films descending on the interior and exterior tube surfaces to drop to said retained body, said tubes directing gas from said upper chamber downwardly against the surface of said retained liquid body for impingement capture of particles and droplets, said tubes being in mutually spaced relation as a set occupying the remaining part of said horizontal extent of the upper region of the lower chamber, whereby gas leaving the bottom tube ends to reach said chest in great part is constrained to flow between and past said tubes exposing the exterior wetted tube surfaces to particle capture.

2. Apparatus as described in claim 1, wherein said bottom outlet is provided with a withdrawal flow control valve to a drain line; and said overflow outlet is connected to said drain line below the valve.

3. Apparatus as described in claim 1, wherein each of said tubes is loosely supported on said plate partition by a respective tube top end flange providing a plate-engaging shoulder spaced downwardly from the tube end.

4. Apparatus as described in claim 1, wherein said tubes are provided with respective longitudinal twist baffles.

5. Apparatus as described in claim 1, wherein, said outlet duct gas intake chest comprises a portion of a vertical conduit extending from a lower end of the chest portion through said partition and the vessel top as an exteriorly opening gas outlet.

6. Apparatus as described in claim 5, wherein:
said vessel comprises a vertical cylindrical body, an inverted conical bottom as the bottom wall structure with an outlet at the cone apex for withdrawal of settled particulate matter from the vessel; and said conduit is provided by a cylindrical duct with a bottom end wall and cylindrical wall below said plate partition apertured to form the said outlet duct gas intake chest.

7. Apparatus as described in claim 5, wherein said vertical conduit is removably mounted in said vessel dependent through aligned respective apertures in a vessel top closing wall and said partition, by means sealingly securing the top portion of the conduit to said top wall, and including means forming a liquid overflow dam about the aperture around said conduit through said partition.

8. Apparatus as described in claim 7, wherein said dam provides a circumferential clearance with said conduit permitting seepage of liquid from said layer to form a liquid film descending on said conduit into said lower chamber and substantially sealing the conduit against gas by-pass from the upper chamber and lower chamber.

9. Apparatus as described in claim 8, wherein the upper ends of said tubes project equally above said plate partition, to a height corresponding to the height of a collar as a dam about the plate aperture for said conduit.

10. Apparatus for separating gas-borne substances from a stream of gas by scrubbing with a liquid, comprising:

a vessel closed at the top, and at the bottom closed by a bottom wall structure downwardly convergent to a bottom outlet of the vessel, a transverse plate partition spaced above said bottom wall structure and dividing the vessel into an upper chamber and a lower chamber, a gas stream inlet into the said upper chamber, scrubbing liquid spray head means disposed in said upper chamber adapted to spray said liquid supplied thereto under pressure as particle-gathering droplets into gas entering from said inlet into the upper chamber as a mixing chamber, wherein said droplets descend, to gather in part as a liquid layer wetting said partition, an outlet duct opening through the vessel and having a gas intake chest
disposed in the upper region of said lower chamber and having chest wall portions provided with numerous gas passage apertures, said chest occupying only a minor part of the said horizontal extent of the lower chamber, externally discharging overflow liquid outlet means opening from the lower chamber of the vessel for establishing a normal level for a retained body of said liquid in the bottom region of the lower chamber as a sump, a numerous plurality of tubes extending through respective apertures in, and dependent from, said plate partition
and having a loose fit in their respective apertures, to define spaces between the tubes and aperture edges, said tubes having top ends spaced above said partition, whereby said liquid sprayed into said mixing chamber may pass into said tubes and may pass, from said layer gathered on said plate, between said tubes and edges of respective said apertures to form particle and droplet gathering liquid films descending on the interior and exterior tube surfaces to drop to said retained body, said tubes directing gas from said upper chamber downwardly against the surface of said retained liquid body for impingement-capture of particles and droplets, said tubes being in mutually spaced relation as a set occupying substantially the remaining part of said horizontal extent of the upper region of the lower chamber,
whereby gas leaving the bottom tube ends to reach said chest in great part is constrained to flow between and past said tubes exposing the exterior wetted tube surfaces to particle capture.

* * * * *